(12) United States Patent
Nakamura et al.

(10) Patent No.: US 8,861,965 B2
(45) Date of Patent: Oct. 14, 2014

(54) OPTICAL TRANSMISSION APPARATUS

(75) Inventors: Kentaro Nakamura, Kawasaki (JP);
Norifumi Shukunami, Kawasaki (JP);
Tatsuya Tsuzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 189 days.

(21) Appl. No.: 13/238,152

(22) Filed: Sep. 21, 2011

(65) Prior Publication Data
US 2012/0106968 A1 May 3, 2012

(30) Foreign Application Priority Data

Nov. 2, 2010 (JP) ................................ 2010-246551

(51) Int. Cl.
*H04J 14/02* (2006.01)

(52) U.S. Cl.
CPC ......... *H04J 14/0212* (2013.01); *H04J 14/0221* (2013.01)
USPC ................... 398/79; 398/82; 398/85; 398/91; 398/48

(58) Field of Classification Search
CPC .... H04B 10/50; H04B 10/501; H04B 10/502; H04B 10/503; H04B 10/506; H04J 2014/02; H04J 14/0209; H04J 14/0278; H04J 12/02; H04J 14/0201; H04J 14/0205; H04J 14/0212; H01S 3/0064
USPC ......... 398/79, 82, 85, 91, 92, 45, 48, 56, 182, 398/97, 173
See application file for complete search history.

(56) References Cited

U.S. PATENT DOCUMENTS

| | | | |
|---|---|---|---|
| 6,606,189 B2 | 8/2003 | Akiyama | |
| 6,922,280 B1 | 7/2005 | Sugaya | |
| 7,376,355 B2* | 5/2008 | Ota | ................................ 398/167 |
| 2001/0012431 A1* | 8/2001 | Taneda et al. | ................. 385/122 |
| 2002/0101652 A1* | 8/2002 | Hayashi et al. | ............. 359/341.4 |
| 2007/0166038 A1* | 7/2007 | Yano | ............................... 398/79 |
| 2008/0069572 A1* | 3/2008 | Ikeda et al. | .................... 398/158 |

(Continued)

FOREIGN PATENT DOCUMENTS

| | | |
|---|---|---|
| EP | 0936768 A2 | 8/1999 |
| EP | 1024541 | 8/2000 |

(Continued)

OTHER PUBLICATIONS

Fiberlabs Inc., "C-band ASE Light Source", http://www.fiberlabs-inc.com/ase_cband.htm Aug. 26, 2010.

(Continued)

*Primary Examiner* — Daniel Washburn
*Assistant Examiner* — Hibret Woldekidan
(74) *Attorney, Agent, or Firm* — Fujitsu Patent Center

(57) ABSTRACT

There is provided an optical transmission apparatus including: a transmitter to output an optical signal to be transferred to other optical transmission apparatus; a first dummy light source to generate first dummy light having a wavelength which is not included in an optical signal received from other optical transmission apparatus; a first wavelength-multiplexer to wavelength-multiplex the optical signal received from other optical transmission apparatus, the optical signal output from the transmitter, and an optical signal with a wavelength, of the first dummy light, which is not included in the optical signal received from other optical transmission apparatus and in the optical signal output from the transmitter; and an optical amplifier to amplify an optical signal multiplexed by the first wavelength-multiplexer.

12 Claims, 15 Drawing Sheets

(56) References Cited

U.S. PATENT DOCUMENTS

| | | | |
|---|---|---|---|
| 2008/0137179 A1* | 6/2008 | Li et al. | 359/337.13 |
| 2008/0310858 A1* | 12/2008 | Lu et al. | 398/158 |
| 2012/0087658 A1* | 4/2012 | Jander | 398/48 |

FOREIGN PATENT DOCUMENTS

| | | |
|---|---|---|
| JP | 11-168449 | 6/1999 |
| JP | 2000-286492 A | 10/2000 |
| JP | 2001-111495 | 4/2001 |
| JP | 2002-198599 A | 7/2002 |
| JP | 2006-066946 | 3/2006 |
| JP | 2008-172578 | 7/2008 |

OTHER PUBLICATIONS

Finisar, "Wavelength Selective Switches for ROADM Applications", http://www.finisar.com/sites/default/files/pdf/yVzRcEWSS%20ROADM%20Product%20guide_FINAL Dec. 2008.

Texas Instruments, "DLP Technology, How DLP technology Works", http://www.dlp.com/technology/how-dlp-works/default.aspx 2009.

JPOA—Office Action of Japanese Patent Application No. 2010-246551 dated Apr. 22, 2014 with partial English Translation.

* cited by examiner

OPTICAL TRANSMISSION APPARATUS

CROSS-REFERENCE TO RELATED APPLICATION

This application is based upon and claims the benefit of priority of the prior Japanese Patent Application No. 2010-246551, filed on Nov. 2, 2010, the entire contents of which are incorporated herein by reference.

FIELD

The embodiments discussed are relates to an optical transmission apparatus.

BACKGROUND

Wavelength division multiplexing (WDM) technology is available in the optical transmission field. Some WDM systems use an optical add-drop multiplexer (OADM) in which a wavelength selectable switch (WSS) is used. The WSS can add an optical signal with a selected wavelength into an optical signal wavelength-division-multiplexed, drop an optical signal with a selected wavelength from an optical signal wavelength-division-multiplexed. Alternatively, the WSS can switch a path of an optical signal with a selected wavelength.

In a WDM system, an optical signal in which optical signals with a plurality of different wavelengths are multiplexed is sent from an optical transmission apparatus in transmitter node. The optical signal sent from the optical transmission apparatus in transmitter node passes through an optical transmission line such as an optical fiber, and is received by the an optical transmission apparatus in receiver node, where the optical signal is split into optical signals with the different wavelength and is received for each wavelength. At least one optical transmission apparatus in repeater node may be provided between the transmitter node and the receiver node. The optical transmission apparatus in repeater node amplifies the optical signal that it has received by using, for example, an optical preamplifier or optical post-amplifier, and sends the amplified optical signal to the optical transmission apparatus in receiver node. The optical transmission apparatus in repeater node may use the above-mentioned OADM to extract (drop) an optical signal with a particular wavelength from an optical signal in which optical signals with different wavelengths are multiplexed or to include (add) an optical signal with a particular wavelength into an optical signal in which optical signals with different wavelengths are multiplexed.

During an operation in an optical communication system, a wavelength that has not been used at the start of the operation may be used. In this case, since the number of wavelengths used is increased, the level diagram may be changed. In prior art, to prevent the level diagram from being changed, dummy light is inserted for the wavelength that has not been originally used.

To insert dummy light, some light sources output light with a predetermined wavelength from light emitted from a wideband light source, such as an amplified spontaneous emission (ASE) light source, by using a configuration formed with an arrayed waveguide grating (AWG), a combination of an optical coupler and a narrow band pass filter, a combination of an optical coupler, a circulator and a fiber grating, or a combination of a circulator, a plurality of fiber gratings and an AWG. Exemplary ASE light sources include the ASE-FL7010 manufactured by FiberLabs Inc. (searched for on the Internet on Aug. 26, 2010, URL<http://www.fiberlabs.co.jp/lightsource/ase_cband.htm>).

The number of channels of multiplexed signals may rapidly change because of, for example, a failure in an optical transmission apparatus. To cope with this problem, some optical amplifiers prevent excessive output of signal light with the remaining wavelengths escaping the failure. For example, one of these optical amplifiers amplifies part of a light signal including a light signal and dummy light included in the light signal with an optical amplifying unit, removes the dummy light from the amplified light signal and dummy light with a filter, and controls the dummy light so that the light output from the light source of the dummy light becomes to a predetermined light output with a dummy light control circuit. Japanese Laid-open Patent Publication Nos. 2000-286492 and 2002-198599 are examples of related art.

SUMMARY

According to an aspect of the embodiment, there is provided an optical transmission apparatus including: a transmitter to output an optical signal to be transferred to other optical transmission apparatus; a first dummy light source to generate first dummy light having a wavelength which is not included in an optical signal received from other optical transmission apparatus; a first wavelength-multiplexer to wavelength-multiplex the optical signal received from other optical transmission apparatus, the optical signal output from the transmitter, and an optical signal with a wavelength, of the first dummy light, which is not included in the optical signal received from other optical transmission apparatus and in the optical signal output from the transmitter; and an optical amplifier to amplify an optical signal multiplexed by the first wavelength-multiplexer.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
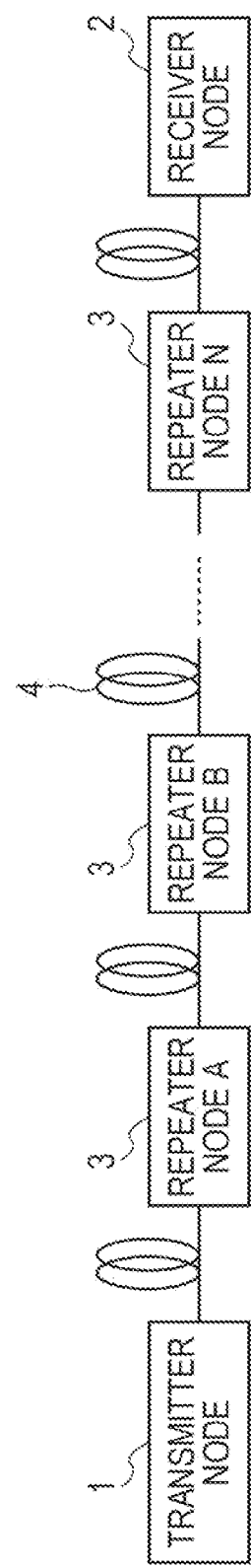
FIG. 1 is a block diagram of an optical transmission system according to a first embodiment.

As above stated, the conventional systems cannot send the dummy light to the optical transmission line. Accordingly, if a failure occurs in the middle of the optical transmission line, for example, an optical fiber is broken, an optical transmission apparatus in all repeater nodes on the same side of the receiver node, relative to the place of the failure, need to control of preventing excessive output of signal light with the remaining wavelengths. If the control speed is not adequate, uncompensable variations propagate and input power to the optical amplifier is rapidly decreased. The excitation energy of the optical amplifier then concentrates on the remaining wavelengths, that is, the wavelengths of the optical signal multiplexed in the optical transmission apparatus in repeater node, and the light output with the remaining wavelengths is transiently increased. As a result, at the optical transmission apparatus in receiver node, the signal may be instantaneously interrupted by a large change in light intensity or the receiver of the optical transmission apparatus may be broken by an input of large optical power.

With the conventional systems, dummy light needs to be within the amplification band of the optical amplifier. Since the wavelength of the dummy light is fixed, the band of transmittable wavelengths is restricted. In that since the dummy light is directly added into the signal light without being passed through a filter, the transmission quality of the signal light particularly near the dummy light may be deteriorated. Since a dedicated dummy light control circuit is necessary to control the dummy light so that the light output from the light source of the dummy light becomes a predetermined light output, costs are increased.

Preferred embodiments of an optical transmission system and optical transmission apparatus in this disclosure will be described in detail with reference to the drawings. The optical transmission apparatus combine dummy light including a wavelength that is which is not included in an optical signal (WDM signal) with the WDM signal, input from a transmission line, in which optical signals with a plurality of different wavelengths are multiplexed, after which they amplify and output the resulting signal. Even if the WDM signal is instantaneously interrupted, the optical transmission apparatus thereby suppress a reduction of input power to an optical amplifying unit. In the descriptions of the embodiments that follow, like elements are denoted by like reference numerals to eliminate duplicate descriptions.

First Embodiment

FIG. 1 is a block diagram of an optical transmission system according to a first embodiment. As depicted in FIG. 1, the optical transmission system includes an optical transmission apparatus in transmitter node 1 and an optical transmission apparatus in receiver node 2, as well as, for example at least one optical transmission apparatus in repeater node 3. For example, the optical transmission apparatus in transmitter node 1 sends a WDM signal, the optical transmission apparatus in repeater node 3 is set up between the transmitter node 1 and the receiver node 2. The optical transmission apparatus in repeater node 3 receives the WDM signal, amplifies the received WDM signal, and sends the amplified WDM signal to the receiver node 2. The optical transmission apparatus in receiver node 2 splits the WDM signal into optical signals with individual waveforms and receives the split optical signals for each wavelength.

Figure 2:
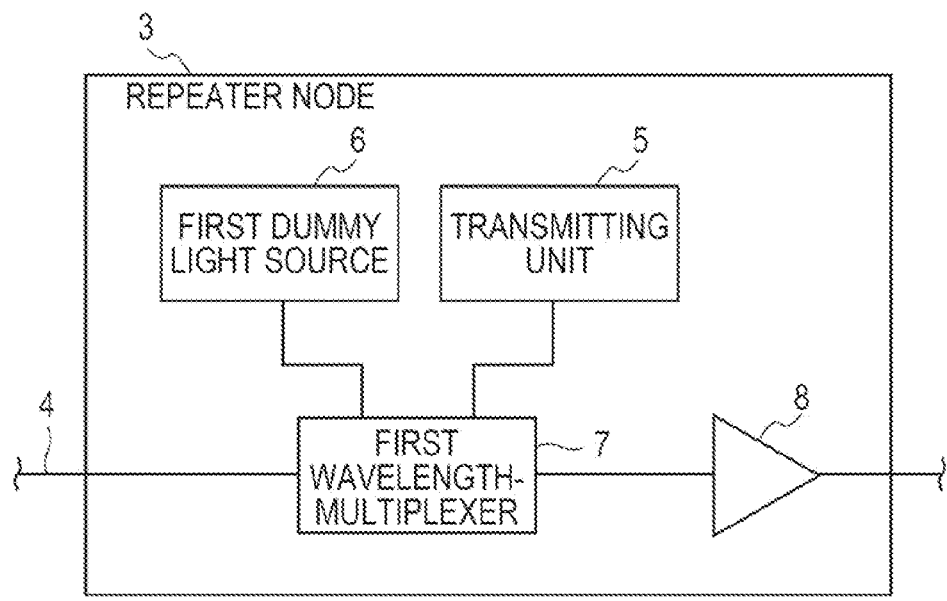
FIG. 2 is a block diagram of an optical transmission apparatus according to the first embodiment.

FIG. 2 is a block diagram of an optical transmission apparatus according to the first embodiment. As depicted in FIG. 2, the optical transmission apparatus in repeater node 3 includes a transmitting unit 5, a first dummy light source 6, a first wavelength-multiplexer 7, and an optical amplifying unit 8. The transmitting unit 5 outputs an optical signal with wavelengths to be multiplexed in the optical transmission apparatus in repeater node 3. The first dummy light source 6 outputs first dummy light including wavelengths that are not used in the WDM signal input from the transmission line 4. The first wavelength-multiplexer 7 multiplexes the first dummy light, the WDM signal input from the transmission line 4, and the optical signal output from the transmitting unit 5 together. The optical amplifying unit 8 amplifies the optical signal output from the first wavelength-multiplexer 7.

According to the first embodiment, since the WDM signal input from the transmission line 4 and the first dummy light including light with wavelengths not used in the WDM signal are multiplexed and the multiplexed signal is then amplified by the optical amplifying unit 8, a reduction of input power to the optical amplifying unit 8 can be suppressed even if the WDM signal is instantaneously interrupted. As a result, it becomes possible to suppress the concentration of the excitation energy of the optical amplifier 8 on the optical signal with the wavelengths output from the transmitting unit 5, thereby it becomes possible to prevent the light output of the optical signal output from the transmitting unit 5 from transiently becoming large. Since a change in light intensity at the optical transmission apparatus in receiver node 2 can be suppressed, therefore, it is possible to avoid failures such as an instantaneous signal interruption at the optical transmission apparatus in receiver node 2 and to prevent the receiver from being broken by an input of large optical power.

Second Embodiment

Figure 3:
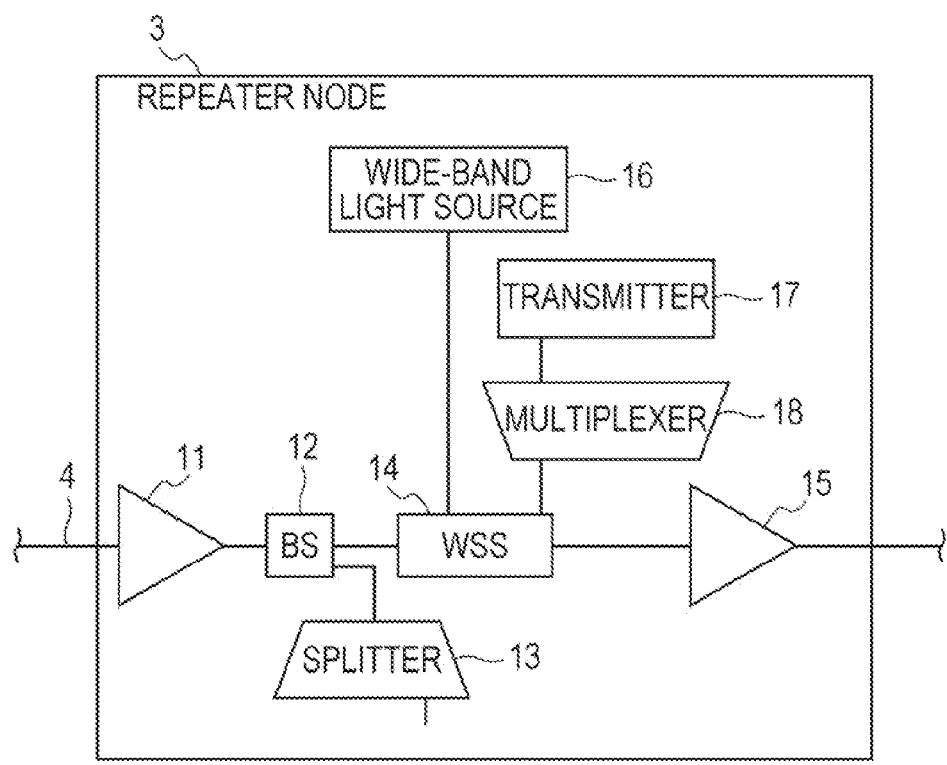
FIG. 3 is a block diagram of an optical transmission apparatus according to a second embodiment.

FIG. 3 is a block diagram of an optical transmission apparatus according to a second embodiment. As depicted in FIG.

3, in the second embodiment, a wavelength selectable switch 14 is used to multiplex the optical signal to be transmitted from the optical transmission apparatus in repeater node 3 and the first dummy light into a WDM signal. The optical transmission apparatus in repeater node 3 includes an optical preamplifier 11, the wavelength selectable switch 14 used as the first wavelength-multiplexer, a wide-band light source 16 used as a first dummy light source, a transmitter 17 and a multiplexer 18 such as an arrayed waveguide grating used as the transmitting unit, and an optical post-amplifier 15 used as an optical amplifying unit.

The optical preamplifier 11 amplifies the WDM signal that is input through the transmission line 4, such as an optical fiber, from the other optical transmission apparatus. Examples of the wide-band light source 16 include an amplified ASE light source as described above and a light emitting diode (LED) light source. The wide-band light source 16 outputs the first dummy light including a band of all wavelengths that can be multiplexed by the optical transmission system in this disclosure. The transmitter 17 outputs an optical signal with wavelengths to be transmitted from the optical transmission apparatus in repeater node 3. The multiplexer 18 multiplexes the optical signals output from the transmitter 17 and outputs to one port of the wavelength selectable switch 14.

The wavelength selectable switch 14 selects the wavelengths of the optical signal, which has been multiplexed in the WDM signal, which has been output from the optical preamplifier 11 and input to the wavelength selectable switch 14, and outputs an optical signal with the selected wavelengths to the optical post-amplifier 15. The wavelength selectable switch 14 also selects the wavelengths of optical signal, which has been output from the transmitter 17 and have been multiplexed by the multiplexer 18, and outputs an optical signal with the selected wavelengths to the optical post-amplifier 15. Specifically, the wavelength selectable switch 14 selects wavelengths of the optical signal that are not assigned in the optical signal with the wavelengths selected therein (free wavelengths) from the first dummy light output from the wide-band light source 16, and outputs optical signal with the selected wavelengths to the optical post-amplifier 15. The optical post-amplifier 15 amplifies the WDM signal output from the wavelength selectable switch 14.

In the optical transmission apparatus in repeater node 3, the WDM signal output from the optical preamplifier 11 is split by, for example, a beam splitter (BS) 12 set up between the optical preamplifier 11 and the wavelength selectable switch 14. The optical signal of each wavelength split by the beam splitter 12 is split by a splitter 13 such as an arrayed waveguide grating, and input to a receiving unit (not shown).

Figure 4:
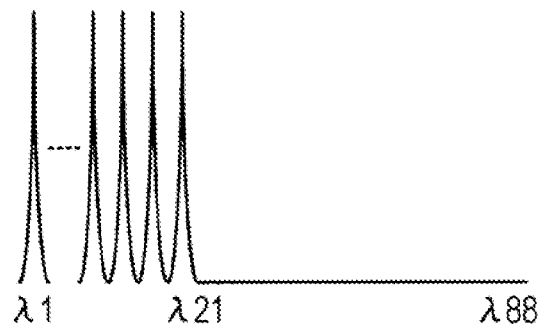
FIG. 4 illustrates an example of a waveform of light transmitted by the optical transmission apparatus according the second embodiment.
Figure 5:
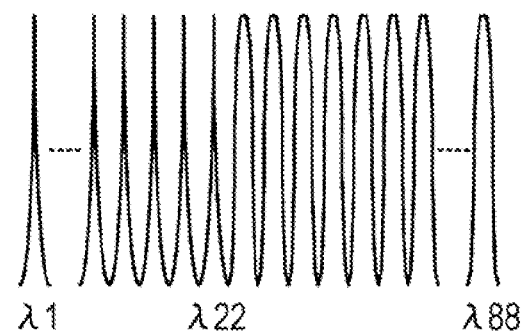
FIG. 5 illustrates another example of a waveform of light transmitted by the optical transmission apparatus according the second embodiment.
Figure 6:
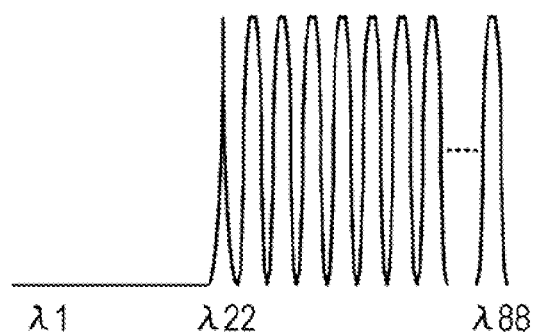
FIG. 6 illustrates another example of a waveform of light transmitted by the optical transmission apparatus according the second embodiment.

FIG. 4 is a waveform diagram illustrating an example of a wavelength of light to be input to the optical transmission apparatus according the second embodiment. FIG. 5 illustrates an example of a wavelength of light to be input to the optical post-amplifier in the optical transmission apparatus according the second embodiment when the input of the WDM signal to the optical transmission apparatus is normal. FIG. 6 illustrates an example of a wavelength of light to be input to the optical post-amplifier in the optical transmission apparatus according the second embodiment when the input of the WDM signal to the optical transmission apparatus is interrupted. As an example, it will be assumed that 88 waves with wavelengths $\lambda1$ to $\lambda88$ can be multiplexed in the optical transmission system, a WDM signal including 21 waves with wavelengths $\lambda1$ to $\lambda21$ is input to the optical transmission apparatus in repeater node 3, and light with wavelength $\lambda22$ is output from the transmitter 17.

As illustrated in FIG. 4, if the input of the WDM signal to the optical transmission apparatus in repeater node 3 is normal, an optical signal in which 21 waves with wavelengths $\lambda1$ to $\lambda21$ has been multiplexed is input to the optical preamplifier 11. As illustrated in FIG. 5, if the input of the WDM signal to the optical transmission apparatus in repeater node 3 is normal, the optical signal having 21 waves with wavelengths $\lambda1$ to $\lambda21$, a wave with wavelength $\lambda22$, and part or all of waves with wavelengths $\lambda23$ to $\lambda88$, which constitute the dummy light, are input to the optical post-amplifier 15. The optical post-amplifier 15 amplifies the optical signal, which it has received, and outputs the amplified optical signal. As illustrated in FIG. 6, if the input of the WDM signal to the optical transmission apparatus in repeater node 3 is interrupted because, for example, the optical fiber is broken in front of the optical preamplifier 11, a wave with wavelength $\lambda22$, and part or all of waves with wavelengths $\lambda23$ to $\lambda88$ are output to the optical post-amplifier 15.

In the second embodiment, the same effect as in the first embodiment is obtained. In the examples in FIGS. 4 to 6, it will be assumed that the optical signal having 66 waves with wavelengths $\lambda23$ to $\lambda88$ are input to the optical post-amplifier 15 as the dummy light. If the WDM signal ($\lambda1$ to $\lambda21$) input to the optical transmission apparatus in repeater node 3 is normal, the optical signal having 88 waves with wavelengths $\lambda1$ to $\lambda88$ are input to the optical post-amplifier 15. If the WDM signal ($\lambda1$ to $\lambda21$) input to the optical transmission apparatus in repeater node 3 is interrupted, the optical signal having 67 waves with wavelengths $\lambda22$ to $\lambda88$ are input to the optical post-amplifier 15. Even when the wavelength of the input to the optical post-amplifier 15 is reduced from 88 waves to 67 waves, a change in input power to the optical post-amplifier 15 is only 1.2 dB. By contrast, if the dummy light including 66 waves with wavelengths $\lambda23$ to $\lambda88$ is not multiplexed, the wavelength of the input to the optical post-amplifier 15 is reduced from 22 waves with wavelengths $\lambda1$ to $\lambda22$ to one wave with wavelength $\lambda22$ because of the interruption of the input ($\lambda1$ to $\lambda21$) of the WDM signal to the optical transmission apparatus in repeater node 3. A change in input power to the optical post-amplifier 15 is 13.4 dB. That is, when dummy light is multiplexed, even if the input of the WDM signal to the optical transmission apparatus in repeater node 3 is interrupted, a change in input power to the optical post-amplifier 15 can be suppressed, so a change in light output from the optical transmission apparatus in repeater node 3 can also be suppressed.

Third Embodiment

Figure 7:
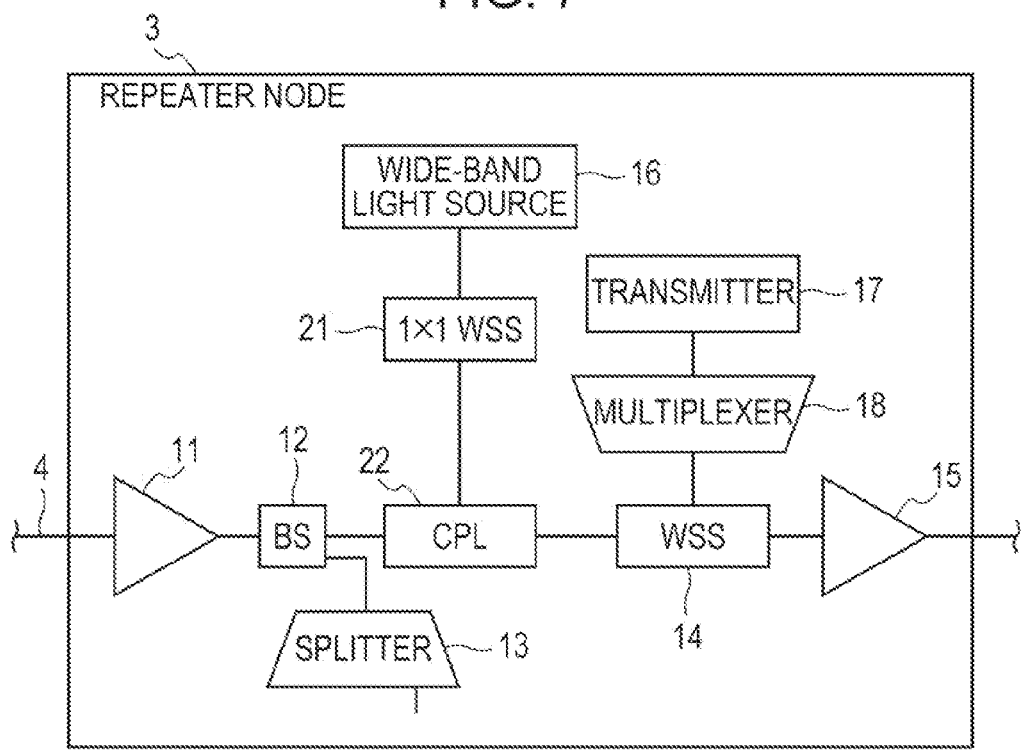
FIG. 7 is a block diagram of an optical transmission apparatus according to a third embodiment.

FIG. 7 is a block diagram of an optical transmission apparatus according to a third embodiment. As depicted in FIG. 7, the third embodiment differs from the second embodiment in that the first dummy light is multiplexed between the beam splitter 12 and the wavelength selectable switch 14. The optical transmission apparatus in repeater node 3 in the third embodiment has a coupler 22 and the wavelength selectable switch 14 as the first wavelength-multiplexer, the wide-band light source 16 as the first dummy light source, and a 1×1 wavelength selectable switch (1×1 WSS) 21, which includes one input port and one output port.

The 1×1 wavelength selectable switch 21 may be smaller than the wavelength selectable switch 14. Examples of technology that implements a small wavelength selectable switch include digital light processing (DLP, which is a registered trademark) technology (searched for on the Internet on Oct. 1, 2010, URL<http://www.dlp.com/dlp/regional/jp/technology/what.aspx>) and liquid crystal on silicon (LCOS, which is a registered trademark) (searched for on the Internet on Oct. 1, 2010, URL<http://www.finisar.com/download_yVzRc EWSS%%20ROADM%%20Product%%20guide_FINAL Dec08.pdf>).

The 1×1 wavelength selectable switch 21 selects wavelengths of the optical signal that are not assigned in the optical signal with the wavelengths selected in the optical transmission apparatus (free wavelengths) from the first dummy light output from the wide-band light source 16, and outputs light with the wavelengths selected in the 1×1 wavelength selectable switch 21 to the coupler 22, which is set up between the beam splitter 12 and the wavelength selectable switch 14. The coupler 22 multiplexes the dummy light output from the 1×1 wavelength selectable switch 21 into the WDM signal output from the beam splitter 12, and outputs the multiplexed WDM signal to the wavelength selectable switch 14. The other structures are the same as in the second embodiment. In the third embodiment, the same effect as in the second embodiment is obtained.

Fourth Embodiment

Figure 8:
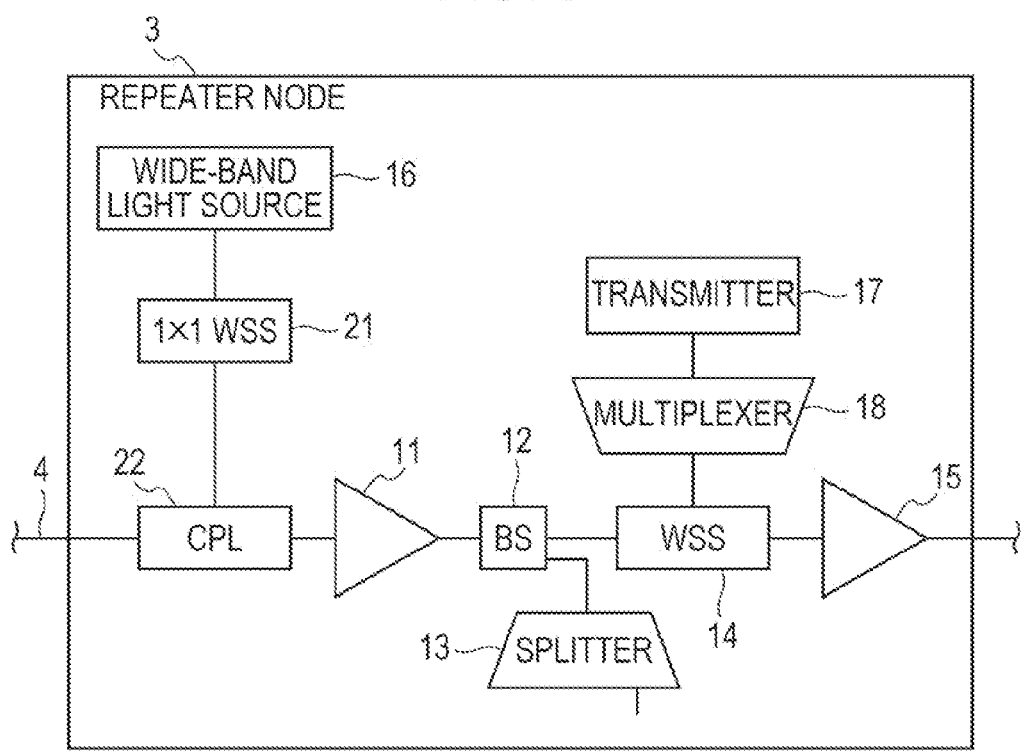
FIG. 8 is a block diagram of an optical transmission apparatus according to a fourth embodiment.

FIG. 8 is a block diagram of an optical transmission apparatus according to a fourth embodiment. As depicted in FIG. 8, the fourth embodiment differs from the third embodiment in that the first dummy light is multiplexed in front of the optical preamplifier 11. In the optical transmission apparatus in repeater node 3 in the fourth embodiment, the coupler 22 is set up in front of the optical preamplifier 11. The coupler 22 multiplexes the dummy light output from the 1×1 wavelength selectable switch 21 into the WDM signal input to the optical transmission apparatus in repeater node 3, and outputs the multiplexed WDM signal to the optical preamplifier 11. The other structures are the same as in the third embodiment. In the fourth embodiment, the same effect as in the second embodiment is obtained.

Fifth Embodiment

Figure 9:
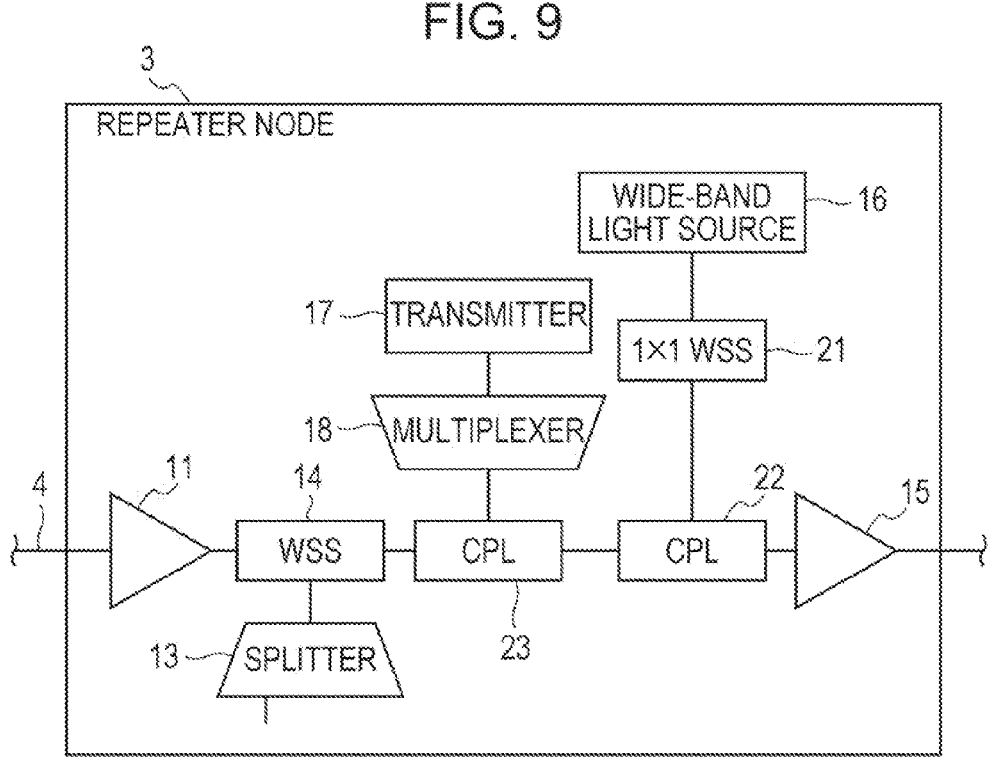
FIG. 9 is a block diagram of an optical transmission apparatus according to a fifth embodiment.

FIG. 9 is a block diagram of an optical transmission apparatus according to a fifth embodiment. As depicted in FIG. 9, the fifth embodiment differs from the third embodiment in that the first dummy light and the optical signal output from the transmitter 17 are set up between the wavelength selectable switch 14 and the optical post-amplifier 15. In the optical transmission apparatus in repeater node 3 in the fifth embodiment, a coupler 23 is used in addition to the coupler 22 and wavelength selectable switch 14 to form the first wavelength-multiplexer. The coupler 23 is set up between the wavelength selectable switch 14 and the optical post-amplifier 15. The coupler 23 multiplexes the optical signal, which has been output from the transmitter 17 and then has been output from the multiplexer 18, into the WDM signal output from the wavelength selectable switch 14 and outputs the multiplexed WDM signal to the optical post-amplifier 15.

The coupler 22 is set up between the coupler 23 and the optical post-amplifier 15. The coupler 22 multiplexes the dummy light output from the 1×1 wavelength selectable switch 21 into the WDM signal output from the coupler 23, and outputs the multiplexed WDM signal to the optical post-amplifier 15. The WDM signal output from the optical preamplifier 11 is branched by the wavelength selectable switch 14 to the coupler 23 and splitter 13. In the fifth embodiment, therefore, the beam splitter 12 connected to an output terminal of the optical preamplifier 11 in the third embodiment depicted in FIG. 7 may be eliminated. The other structures are the same as in the third embodiment. In the fifth embodiment, the same effect as in the second embodiment is obtained. Incidentally, the dummy light may be set up between the optical preamplifier 11 and the wavelength selectable switch 14.

Sixth Embodiment

Figure 10:
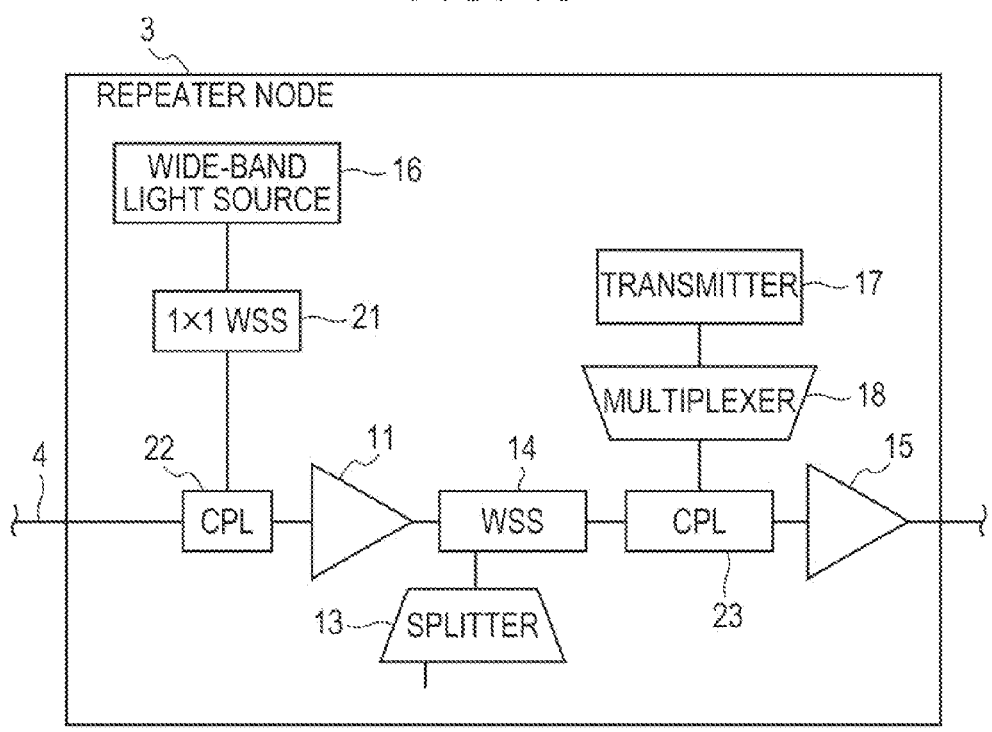
FIG. 10 is a block diagram of an optical transmission apparatus according to a sixth embodiment.

FIG. 10 is a block diagram of an optical transmission apparatus according to a sixth embodiment. As depicted in FIG. 10, the sixth embodiment differs from the fifth embodiment in that the first dummy light is multiplexed in front of the optical preamplifier 11. In the optical transmission apparatus in repeater node 3 in the sixth embodiment, the coupler 22 is set up in front of the optical preamplifier 11. The coupler 22 multiplexes the dummy light output from the 1×1 wavelength selectable switch 21 into the WDM signal input to the optical transmission apparatus in repeater node 3, and outputs the multiplexed WDM signal to the optical preamplifier 11. The other structures are the same as in the fifth embodiment. In the sixth embodiment, the same effect as in the second embodiment is obtained.

Seventh Embodiment

Figure 11:
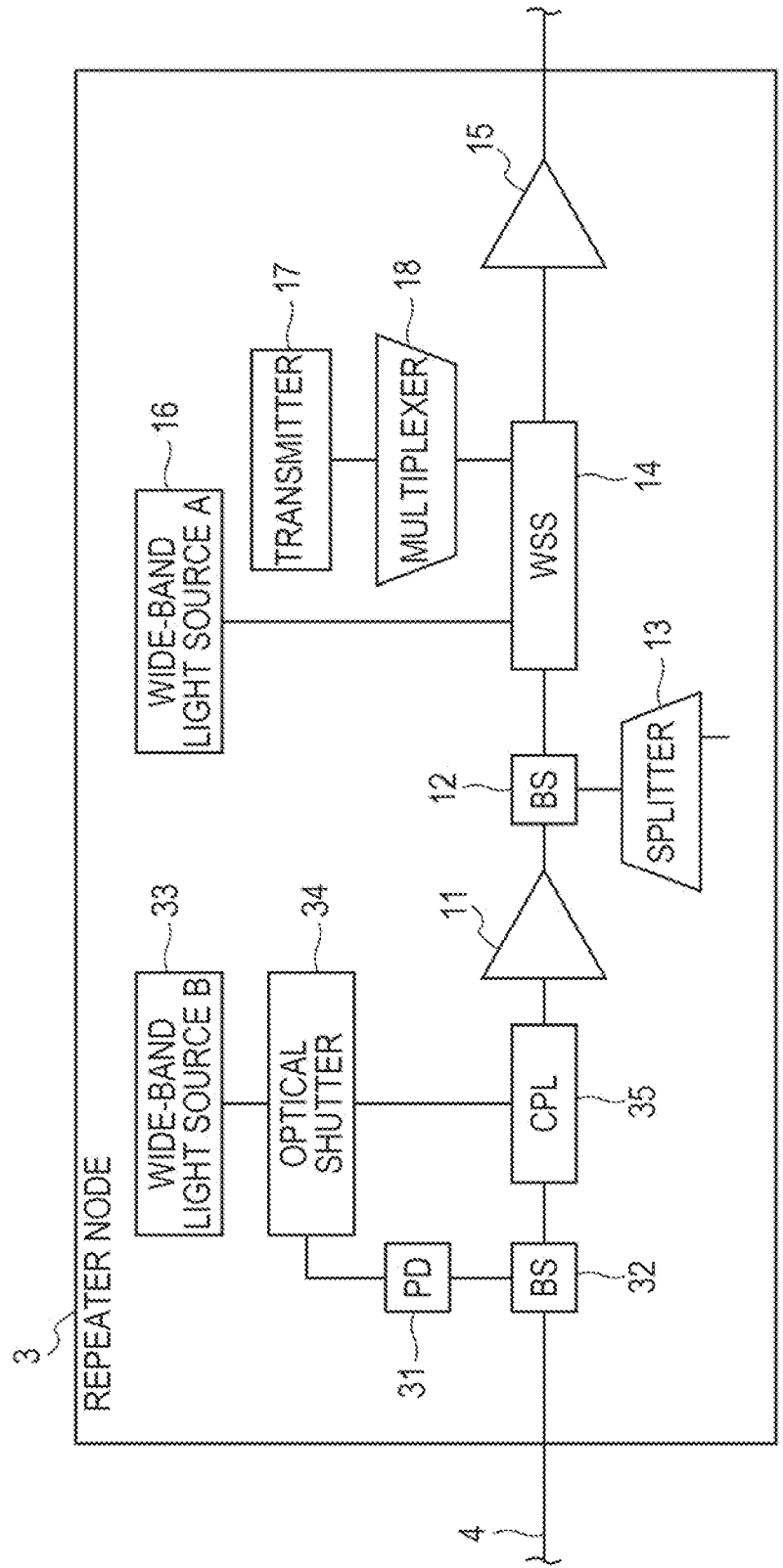
FIG. 11 is a block diagram of an optical transmission apparatus according to a seventh embodiment.

FIG. 11 is a block diagram of an optical transmission apparatus according to a seventh embodiment. As depicted in FIG. 11, the seventh embodiment differs from the second embodiment in that if the input of the WDM signal to the optical transmission apparatus in repeater node 3 is interrupted, the interrupted WDM signal is compensated by dummy light. The optical transmission apparatus in repeater node 3 in the seventh embodiment has a photodetector, such as a photodiode (PD) 31, as a detector, a wide-band light source B 33 as a second dummy light source, an optical shutter 34, and a coupler 35 as a first coupler.

The wide-band light source B 33 outputs second dummy light including a band of all wavelengths that can be multiplexed in the optical transmission system in this disclosure. Examples of the wide-band light source B 33 include a ASE light source as described above and a light emitting diode light source. The wide-band light source 16 in the second to sixth embodiments is now denoted by the wide-band light source A 16 to distinguish it from the wide-band light source B 33.

The WDM signal, which has been input to the optical transmission apparatus in repeater node 3, is split by a beam splitter (BS) 32 to the photodiode 31 and coupler 35. The photodiode 31 allows current to flow according to the power of the optical signal input from the beam splitter 32. When the intensity of the current flowing in the photodiode 31 is monitored, therefore, it becomes possible to determine whether the WDM signal has been input to the optical transmission apparatus in repeater node 3, that is, to detect an interruption of an input of the WDM signal.

If the intensity of the current flowing in the photodiode 31 is equal to or larger than a threshold, that is, the WDM signal has been input to the optical transmission apparatus in repeater node 3, the optical shutter 34 remains closed. While the optical shutter 34 is closed, the optical shutter 34 does not output the second dummy light output from the wide-band light source B 33. If the intensity of the current flowing in the photodiode 31 is smaller than the threshold, that is, the input of the WDM signal to the optical transmission apparatus in repeater node 3 has been interrupted, the optical shutter 34 opens. While the optical shutter 34 is open, the optical shutter 34 outputs the second dummy light output from the wide-band light source B 33. The second dummy light output from the optical shutter 34 is input to the coupler 35. The coupler 35 outputs the second dummy light or the WDM signal output from the beam splitter 32 to the optical preamplifier 11.

If the WDM signal has been input to the optical transmission apparatus in repeater node 3, the wavelength selectable switch 14 selects the optical signal with wavelengths multiplexed to the WDM signal that has been output from the optical preamplifier 11 and to be input to the wavelength selectable switch 14, wavelengths of the optical signal that has been output from the transmitter 17 and has been multiplexed, and wavelengths, of the first dummy light that has been output from the wide-band light source A 16, that are not assigned in the optical signal with the wavelengths selected therein (free wavelengths). If the input of the WDM signal to the optical transmission apparatus in repeater node 3 has been interrupted, the wavelength selectable switch 14 selects the optical signal with wavelengths, of the second dummy light that has been output from the wide-band light source B 33, that have been multiplexed into the WDM signal when the input of the WDM signal to the optical transmission apparatus in repeater node 3 has been interrupted, wavelengths of the optical signal that has been output from the transmitter 17 and has been multiplexed, and wavelengths, of the first dummy light that has been output from the wide-band light source A 16, that are not assigned in the optical signal with the wavelengths selected therein (free wavelengths). The other structures are the same as in the second embodiment.

Figure 12:
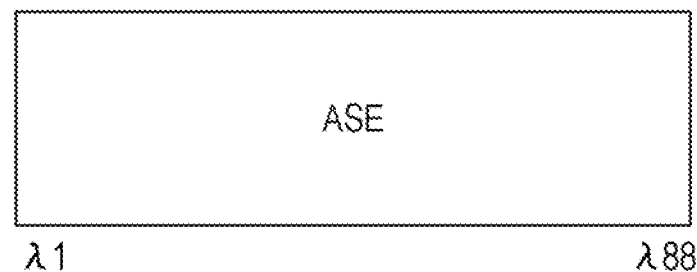
FIG. 12 illustrates an example of a waveform of light transmitted by the optical transmission apparatus according the seventh embodiment.
Figure 13:
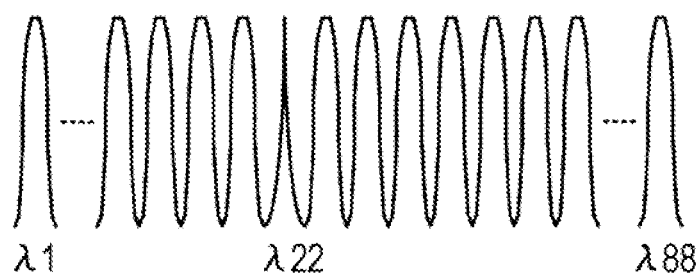
FIG. 13 illustrates another example of a waveform of light transmitted by the optical transmission apparatus according the seventh embodiment.

FIG. 12 is a waveform diagram illustrating an example of a wavelength of light to be input to the optical preamplifier of the optical transmission apparatus according the seventh embodiment when the input of the WDM signal to the optical transmission apparatus is interrupted. FIG. 13 is a waveform diagram illustrating an example of a wavelength of light to be input to the optical post-amplifier of the optical transmission apparatus according the seventh embodiment when the input of the WDM signal to the optical transmission apparatus is interrupted. As an example, it will be assumed that 88 waves with wavelengths $\lambda 1$ to $\lambda 88$ can be multiplexed in the optical transmission system, a WDM signal including 21 waves with wavelengths $\lambda 1$ to $\lambda 21$ is input to the optical transmission apparatus in repeater node 3, and light with wavelength $\lambda 22$ is output from the transmitter 17.

Figure 21:
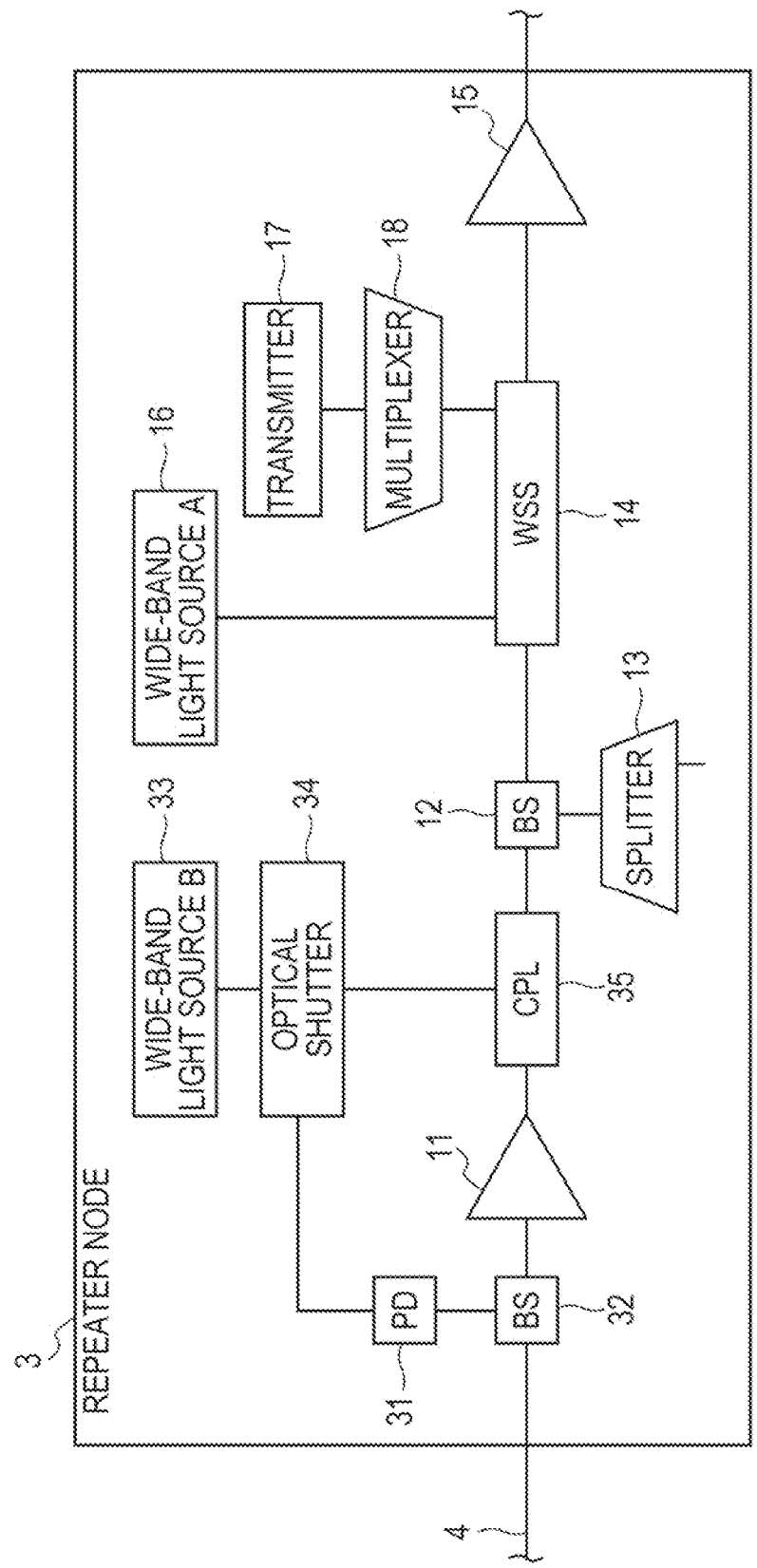
FIG. 21 is a block diagram of an optical transmission apparatus according to a thirteenth embodiment.

If the input of the WDM signal to the optical transmission apparatus in repeater node 3 is normal, an optical signal in which 21 waves with wavelengths $\lambda 1$ to $\lambda 21$ have been multiplexed is input to the optical preamplifier 11 as in the case of the waveforms illustrated in FIG. 4, and 21 waves with wavelengths $\lambda 1$ to $\lambda 21$, a wave with wavelength $\lambda 22$, and part or all of waves with wavelengths $\lambda 23$ to $\lambda 88$, which constitute the first dummy light, are input to the optical post-amplifier 15 as in the case of the waveform illustrated in FIG. 5. If the input of the WDM signal to the optical transmission apparatus in repeater node 3 is interrupted because, for example, the optical fiber is broken in front of the optical transmission apparatus in repeater node 3, the second dummy light (ASE light) including wavelengths $\lambda 1$ to $\lambda 88$ is input to the optical preamplifier 11, as illustrated in FIG. 12. If the input of the WDM signal to the optical transmission apparatus in repeater node 3 is interrupted because, for example, the optical fiber is broken in front of the optical preamplifier 11, the optical signal having waves with wavelengths $\lambda 1$ to $\lambda 21$, which constitute the second dummy light, a wave with a wavelength $\lambda 22$, and part or all of waves with wavelengths $\lambda 23$ to $\lambda 88$, which constitute the first dummy light, are input to the optical post-amplifier 15, as illustrated in FIG. 13.

Figure 14:
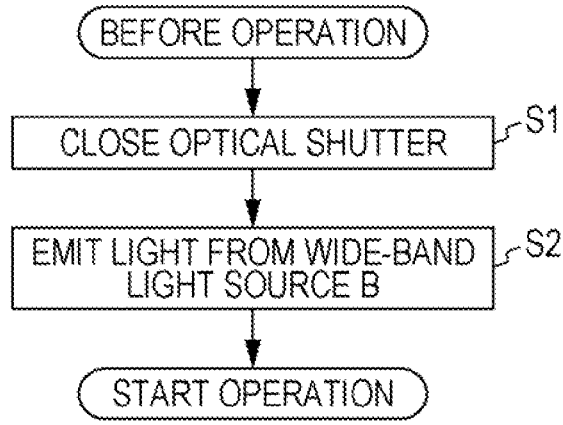
FIG. 14 is a flowchart illustrating control of an optical shutter in the optical transmission apparatus according the seventh embodiment.
Figure 15:
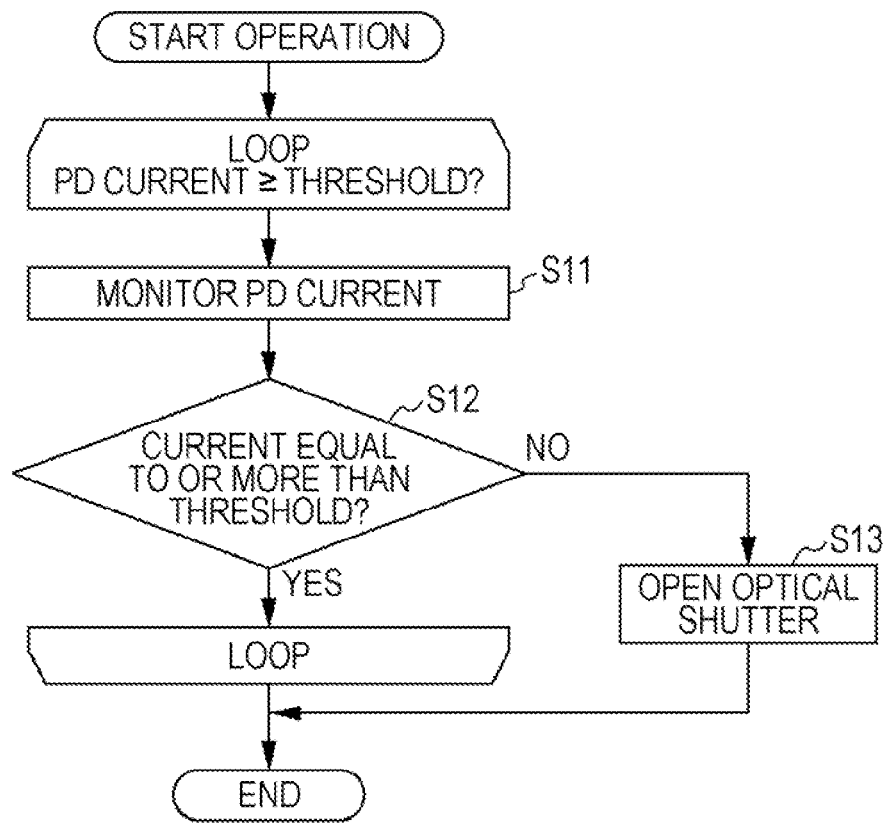
FIG. 15 is another flowchart illustrating control of an optical shutter in the optical transmission apparatus according the seventh embodiment.

FIGS. 14 and 15 are flowcharts illustrating control of the optical shutter in the optical transmission apparatus according the seventh embodiment. As illustrated in FIG. 14, before the operation of the optical transmission system is started, the optical shutter 34 is first closed (step S1). Light is then emitted from the wide-band light source B 33 (step S2). After that, the operation of the optical transmission system including the optical transmission apparatus starts.

As illustrated in FIG. 15, after the operation of the optical transmission apparatus included in the optical transmission system has been started, current flowing in the photodiode 31 is monitored (step S11). Whether the current flowing in the photodiode 31 is equal to or larger than a threshold is determined (step S12). If the current flowing in the photodiode 31 is equal to or larger than the threshold (the result in step S12 is Yes), the monitoring of the current flowing in the photodiode 31 is continued and the operation of the optical transmission system is terminated. If the current in the photodiode 31 is smaller than the threshold (the result in step S12 is No), the optical shutter 34 is opened (step S13).

In the seventh embodiment, the same effect as in the first embodiment is obtained. In the examples in FIGS. 4, 5, 12, and 13, it is assumed that, for example, the optical signal having 66 waves with wavelengths $\lambda 23$ to $\lambda 88$ is input to the optical post-amplifier 15 as the first dummy light. If the input of the WDM signal ($\lambda 1$ to $\lambda 21$) to the optical transmission apparatus in repeater node 3 is normal, the optical signal having 88 waves with $\lambda 1$ to $\lambda 88$ is input to the optical post-amplifier 15. If the input of the WDM signal ($\lambda 1$ to $\lambda 21$) to the optical transmission apparatus in repeater node 3 is interrupted, the optical signal having 88 waves with $\lambda 1$ to $\lambda 88$ is input to the optical post-amplifier 15 by multiplexing the second dummy light. Therefore, even if the input of the WDM signal to the optical transmission apparatus in repeater node 3 is interrupted, a change in input power to the optical post-amplifier 15 can be suppressed, so a change in light output from the optical transmission apparatus in repeater node 3 can also be suppressed.

The photodetector is not limited to the photodiode 31. The optical shutter is not limited to the optical shutter 34; it may be any device, such as an optical switch and an optical attenuator, that can turn on and off a light output or can practically turn on and turn off a light output.

Eighth Embodiment

Figure 16:
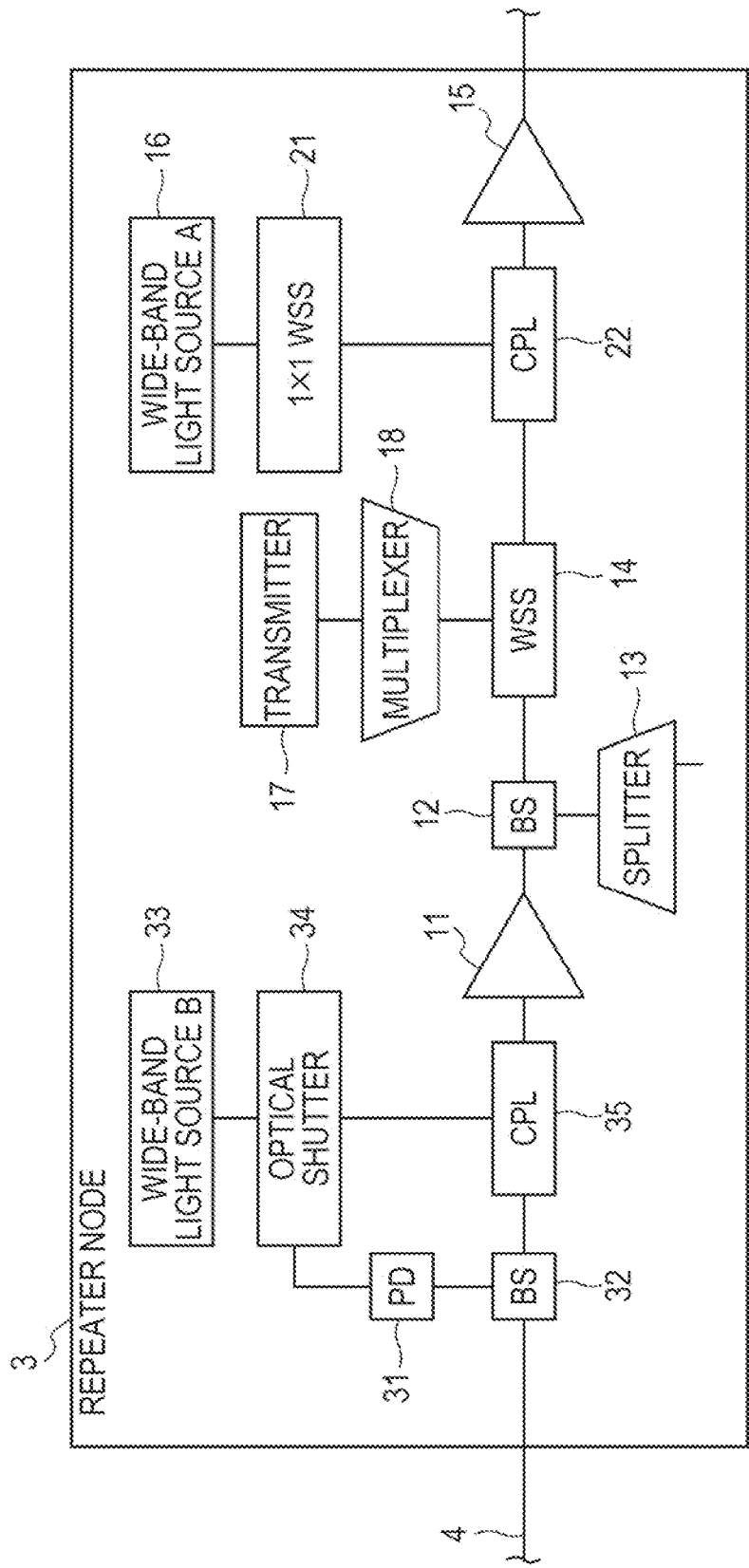
FIG. 16 is a block diagram of an optical transmission apparatus according to an eighth embodiment.

FIG. 16 is a block diagram of an optical transmission apparatus according to an eighth embodiment. As depicted in FIG. 16, the eighth embodiment differs from the seventh embodiment in that the 1×1 wavelength selectable switch 21 and coupler 22 are used to multiplex the first dummy light between the wavelength selectable switch 14 and the optical post-amplifier 15 as in the third embodiment. The other structures are the same as in the seventh embodiment. In the eighth embodiment, the same effect as in the seventh embodiment is obtained.

Ninth Embodiment

Figure 17:
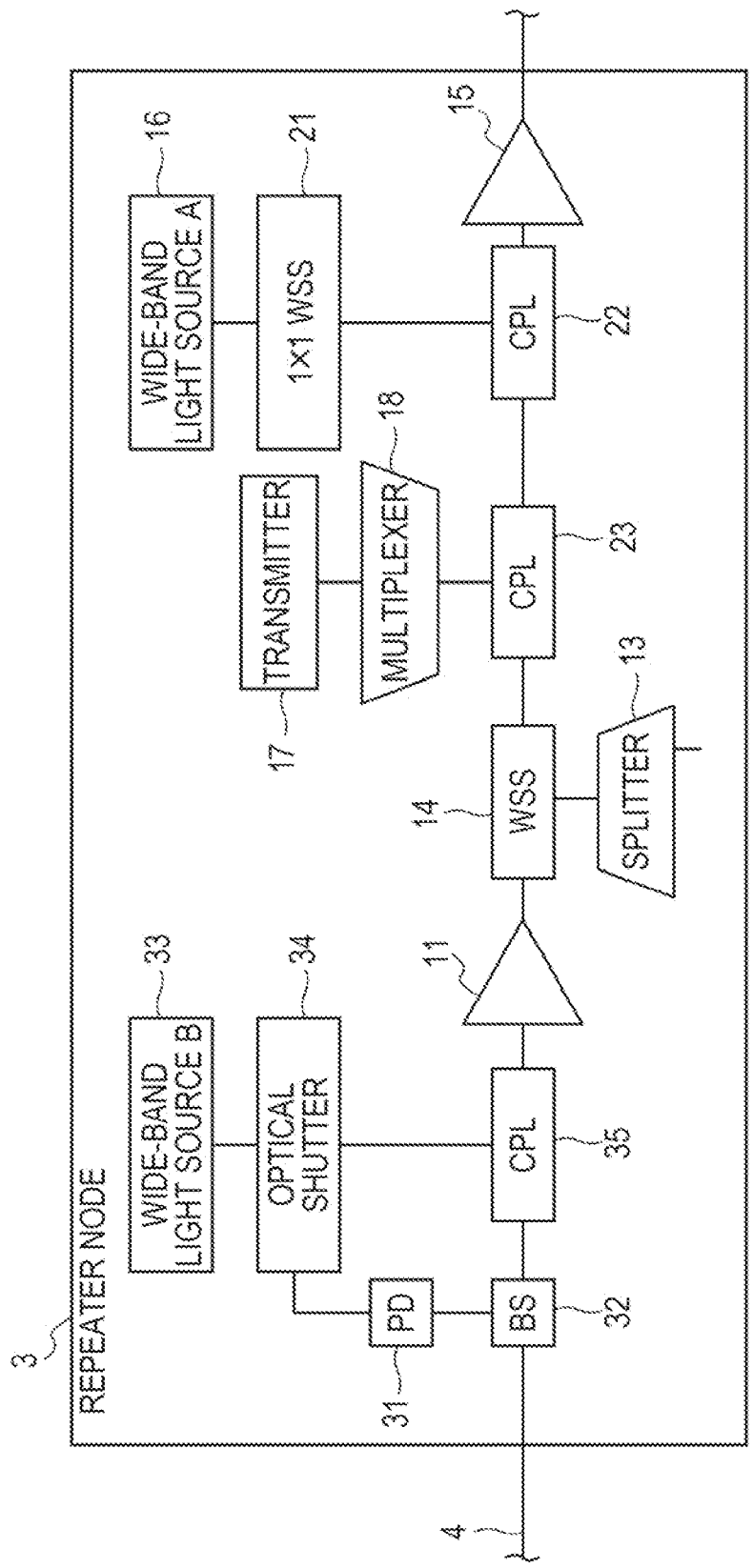
FIG. 17 is a block diagram of an optical transmission apparatus according to a ninth embodiment.

FIG. 17 is a block diagram of an optical transmission apparatus according to a ninth embodiment. As depicted in FIG. 17, the ninth embodiment differs from the seventh embodiment in that the 1×1 wavelength selectable switch 21 and couplers 22 and 23 are used to multiplex the first dummy light and the optical signal output from the transmitter 17 between the wavelength selectable switch 14 and the optical post-amplifier 15 as in the fifth embodiment. The other structures are the same as in the seventh embodiment. In the ninth embodiment, the same effect as in the seventh embodiment is obtained. Incidentally, the first dummy light may be multiplexed in front of the optical preamplifier 11, between the optical preamplifier 11 and the wavelength selectable switch 14, or between the wavelength selectable switch 14 and the coupler 23.

Tenth Embodiment

Figure 18:
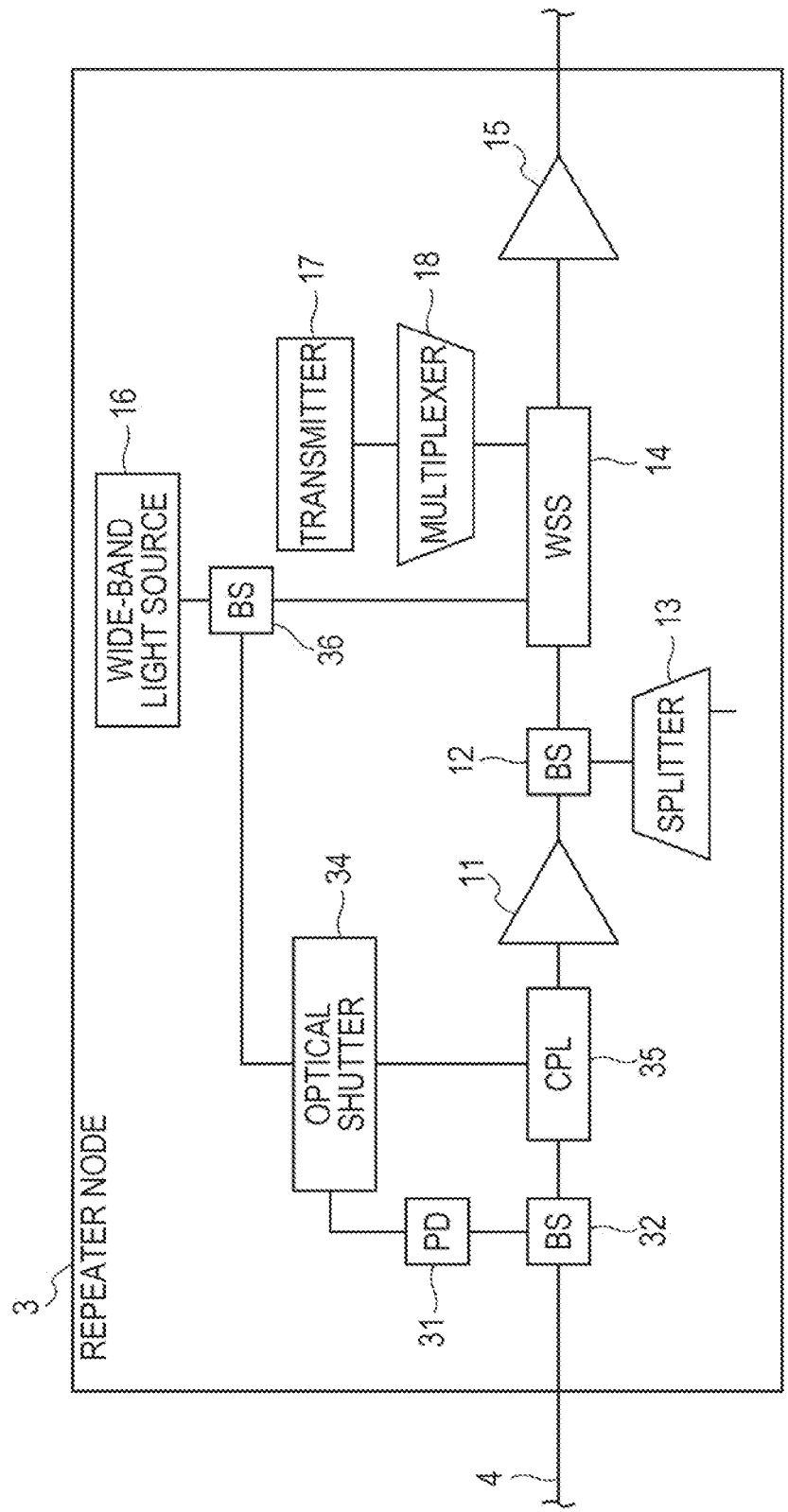
FIG. 18 is a block diagram of an optical transmission apparatus according to a tenth embodiment.

FIG. 18 is a block diagram of an optical transmission apparatus according to a tenth embodiment. As depicted in FIG. 18, the tenth embodiment differs from the seventh embodiment in that the first dummy light and second dummy light are output from the wide-band light source 16. In the optical transmission apparatus in repeater node 3 in the tenth embodiment, the light output from the wide-band light source 16 is split by a beam splitter (BS) 36 set up between the wide-band light source 16 and the wavelength selectable switch 14. One of the light split by the beam splitter 36 is input to the wavelength selectable switch 14 as the first dummy light. The other of the light split by the beam splitter 36 is input to the optical shutter 34 as the second dummy light. The other structures are the same as in the seventh embodiment. In the tenth embodiment, the same effect as in the seventh embodiment is obtained.

Eleventh Embodiment

Figure 19:
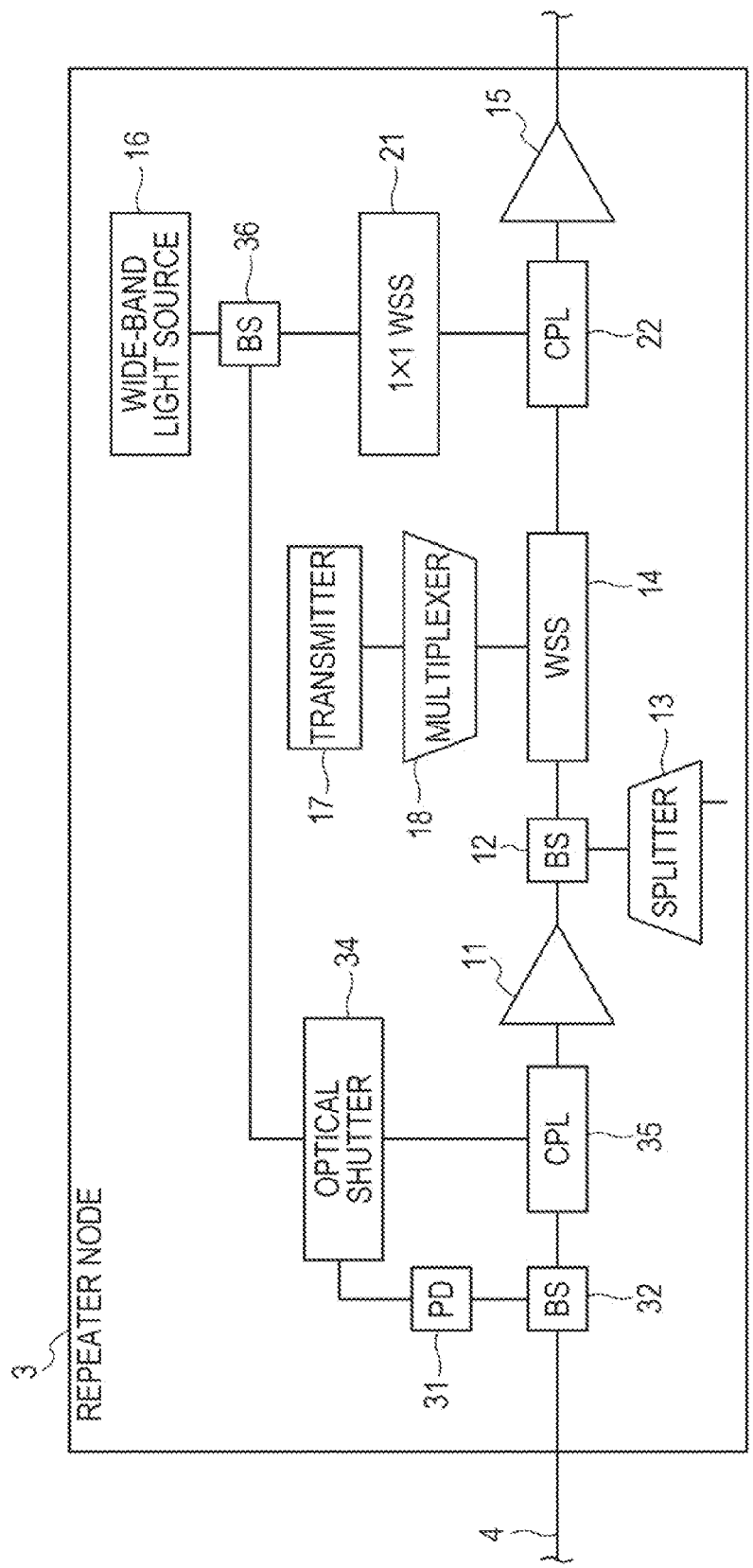
FIG. 19 is a block diagram of an optical transmission apparatus according to an eleventh embodiment.

FIG. 19 is a block diagram of an optical transmission apparatus according to an eleventh embodiment. As depicted in FIG. 19, the eleventh embodiment differs from the eighth embodiment in that the beam splitter (BS) 36 is used to output the first dummy light and second dummy light from the wide-band light source 16 as in the tenth embodiment. The beam splitter 36 is set up between the wide-band light source 16 and the 1×1 wavelength selectable switch 21. The other structures are the same as in the eighth embodiment. In the eleventh embodiment, the same effect as in the seventh embodiment is obtained.

Twelfth Embodiment

Figure 20:
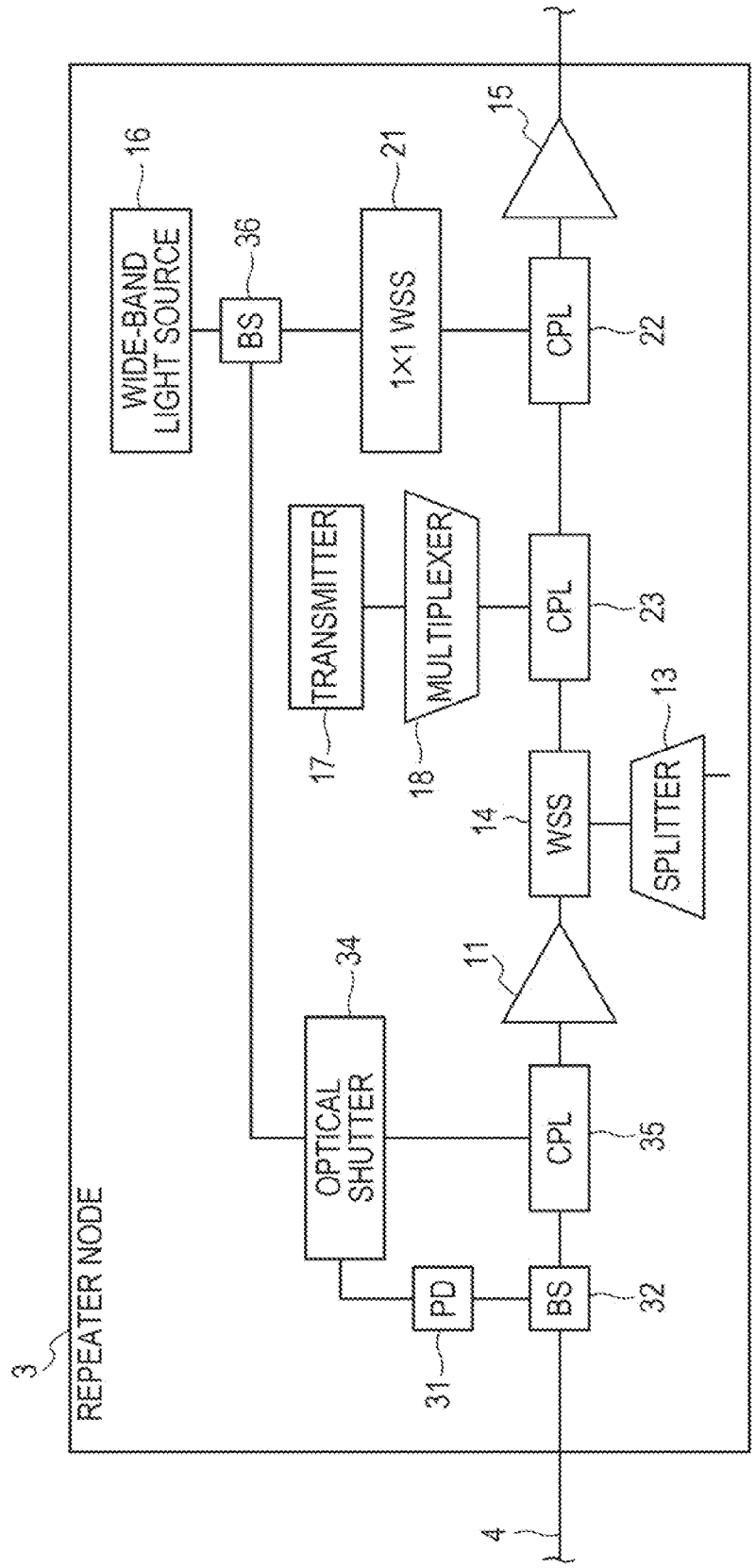
FIG. 20 is a block diagram of an optical transmission apparatus according to a twelfth embodiment.

FIG. 20 is a block diagram of an optical transmission apparatus according to a twelfth embodiment. As depicted in FIG. 20, the twelfth embodiment differs from the ninth embodiment in that the beam splitter (BS) 36 is used to output the first dummy light and second dummy light from the wideband light source 16 as in the eleventh embodiment. The other structures are the same as in the ninth embodiment. In the twelfth embodiment, the same effect as in the seventh embodiment is obtained.

Thirteenth Embodiment

FIG. 21 is a block diagram of an optical transmission apparatus according to a thirteenth embodiment. As depicted in FIG. 21, the thirteenth embodiment differs from the seventh embodiment in that the second dummy light is multiplexed between the optical preamplifier 11 and the beam splitter 12 through the optical shutter 34 and the coupler 35. The other structures are the same as in the seventh embodiment. In the thirteenth embodiment, the same effect as in the seventh embodiment is obtained.

Fourteenth Embodiment

Figure 22:
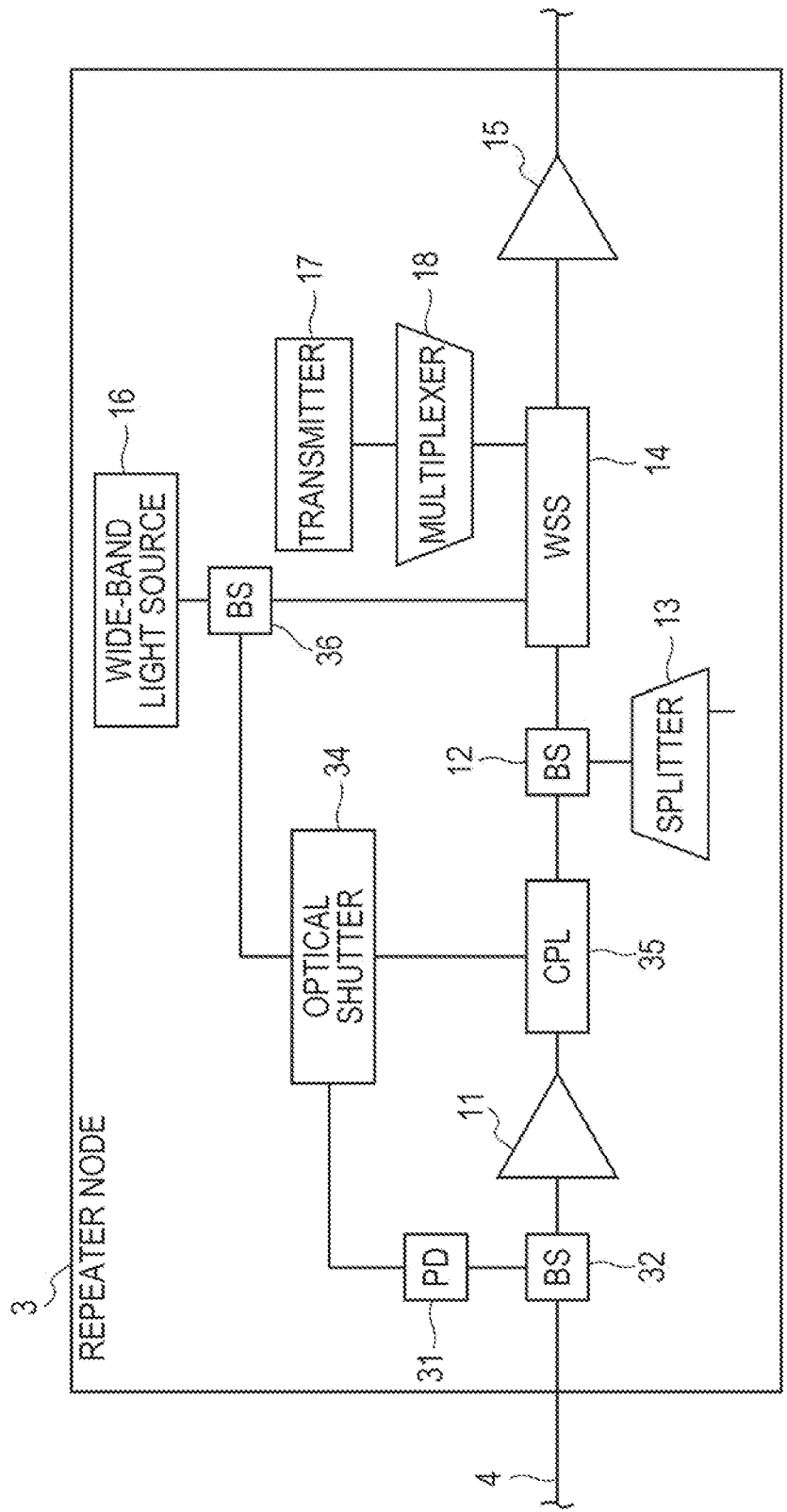
FIG. 22 is a block diagram of an optical transmission apparatus according to a fourteenth embodiment.

FIG. 22 is a block diagram of an optical transmission apparatus according to a fourteenth embodiment. As depicted in FIG. 22, the fourteenth embodiment differs from the tenth embodiment in that the second dummy light is multiplexed between the optical preamplifier 11 and the beam splitter 12 through the optical shutter 34 and the coupler 35. The other structures are the same as in the tenth embodiment. In the fourteenth embodiment, the same effect as in the seventh embodiment is obtained.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:
1. An optical transmission apparatus comprising:
an input receiving a first optical signal from an external device via a transmission line;
a transmitter to output a second optical signal to be transferred to other optical transmission apparatus;
a first dummy light source to generate first dummy light having a wavelength which is not included in the first optical signal;
a first wavelength-multiplexer to wavelength-multiplex the first optical signal received from the external device, the second optical signal output from the transmitter, and an optical signal with a wavelength of the first dummy light, which is not included in the first optical signal and in the second optical signal;
a second wavelength-multiplexer to wavelength-multiplex an optical signal with a wavelength, of the first dummy light; and
a coupler to multiplex the first dummy light output from the second wavelength-multiplexer and the first optical signal; and
an optical amplifier to amplify an optical signal multiplexed by the first wavelength-multiplexer and output the amplified signal to the transmission line, the amplified signal including at least the optical signal with the wavelength of the first dummy light, wherein
the first wavelength-multiplexer wavelength-multiplexes an optical signal multiplexed by the coupler and the second optical signal.
2. The optical transmission apparatus according to claim 1, wherein the first wavelength-multiplexer is a first wavelength selectable switch that selects the wavelength multiplexed in the first optical signal, the wavelength of the second optical signal, and the wavelength, of the first dummy light, and outputs an optical signal with the selected wavelength multiplexed in the first optical signal, the second optical signal, and the first dummy light.
3. The optical transmission apparatus according to claim 1, wherein the transmitter outputs an optical signal wavelength-division-multiplexed.
4. An optical transmission apparatus comprising:
a transmitter to output an optical signal to be transferred to other optical transmission apparatus;
a first dummy light source to generate first dummy light having a wavelength which is not included in an optical signal received from other optical transmission apparatus;

a first wavelength-multiplexer to wavelength-multiplex the optical signal received from other optical transmission apparatus, the optical signal output from the transmitter, and an optical signal with a wavelength, of the first dummy light, which is not included in the optical signal received from other optical transmission apparatus and in the optical signal output from the transmitter;

an optical amplifier to amplify an optical signal multiplexed by the first wavelength-multiplexer;

a second wavelength-multiplexer to wavelength-multiplex an optical signal with a wavelength, of the first dummy light, which is not included in the optical signal received from other optical transmission apparatus and in the optical signal output from the transmitter; and a coupler to multiplex the first dummy light output from the second wavelength-multiplexer and the optical signal received from other optical transmission apparatus, wherein the first wavelength-multiplexer wavelength-multiplexes an optical signal multiplexed by the coupler and the optical signal output from the transmitter, wherein the first wavelength-multiplexer is the first wavelength selectable switch that selects the wavelength of the optical signal multiplexed by the coupler and the wavelength of the optical signal output from the transmitter, and outputs the optical signal with the selected wavelength multiplexed by the coupler and the optical signal with the selected wavelength output from the transmitter, wherein the second wavelength-multiplexer is a second wavelength selectable switch that selects the wavelength, of the first dummy light, which is not included in the optical signal received from other optical transmission apparatus and in the optical signal output from the transmitter and output the first dummy light with the selected wavelength.

5. An optical transmission apparatus comprising:
a transmitter to output an optical signal to be transferred to other optical transmission apparatus;

a first dummy light source to generate first dummy light including a wavelength which is not included in an optical signal received from other optical transmission apparatus;

a second dummy light source to generate second dummy light including a wavelength used in the optical signal received from other optical transmission apparatus;

a detector to monitor the optical signal received from other optical transmission apparatus so as to detect an input interruption thereof;

an optical shutter to output the second dummy light in case of detecting the input interruption, and stop outputting the second dummy light in case of not detecting the input interruption;

a first coupler to multiplex the second dummy light output from the optical shutter and the optical signal received from other optical transmission apparatus;

a first wavelength-multiplexer to wavelength-multiplex an optical signal multiplexed by the first coupler, the optical signal output from the transmitter, and an optical signal with a wavelength, of the first dummy light, which is not included in the optical signal received from other optical transmission apparatus and in the optical signal output from the transmitter; and an optical amplifier to amplify an optical signal multiplexed by the first wavelength-multiplexer.

6. The optical transmission apparatus according to claim 5, wherein the first wavelength-multiplexer is a first wavelength selectable switch that selects the wavelength of the optical signal multiplexed by the first coupler, the wavelength of the optical signal output from the transmitter, and the wavelength, of the first dummy light, which is not included in the optical signal received from other optical transmission apparatus and in the optical signal output from the transmitter, and output the optical signal with the selected wavelength multiplexed by the first coupler, the optical signal with the selected wavelength output from the transmitter, and the first dummy light with the selected wavelength.

7. The optical transmission apparatus according to claim 5, wherein the first dummy light source generates the first dummy light and the second dummy light.

8. The optical transmission apparatus according to claim 5, wherein the transmitter outputs an optical signal wavelength-division-multiplexed.

9. An optical transmission apparatus comprising:
a transmitter to output an optical signal to be transferred to other optical transmission apparatus;

a first dummy light source to generate first dummy light including a wavelength which is not included in an optical signal received from other optical transmission apparatus;

a second dummy light source to generate second dummy light including a wavelength used in the optical signal received from other optical transmission apparatus;

a detector to monitor the optical signal received from other optical transmission apparatus so as to detect an input interruption thereof;

an optical shutter to output the second dummy light in case of detecting the input interruption, and stop outputting the second dummy light in case of not detecting the input interruption;

a first coupler to multiplex the second dummy light output from the optical shutter and the optical signal received from other optical transmission apparatus;

a first wavelength-multiplexer to wavelength-multiplex an optical signal multiplexed by the first coupler and the optical signal output from the transmitter;

a second wavelength-multiplexer to wavelength-multiplex an optical signal with a wavelength, of the first dummy light, which is not included in the optical signal received from other optical transmission apparatus and in the optical signal output from the transmitter;

a second coupler to multiplex the first dummy light output from the second wavelength-multiplexer and the optical signal output from the first wavelength-multiplexer; and an optical amplifier to amplify an optical signal multiplexed by the second coupler.

10. The optical transmission apparatus according to claim 9,
wherein the first wavelength-multiplexer is a first wavelength selectable switch that selects the wavelength of the optical signal multiplexed by the first coupler and the wavelength of the optical signal output from the transmitter, and output the optical signal with the selected wavelength multiplexed by the first coupler and the optical signal with the selected wavelength output from the transmitter, wherein the second wavelength-multiplexer is a second wavelength selectable switch that selects the wavelength, of the first dummy light, which is not included in the optical signal received from other optical transmission apparatus and in the optical signal output from the transmitter and output the first dummy light with the selected wavelength.

11. The optical transmission apparatus according to claim 9, wherein the first dummy light source generates the first dummy light and the second dummy light.

12. The optical transmission apparatus according to claim 9, wherein the transmitter outputs an optical signal wavelength-division-multiplexed.

* * * * *